(12) United States Patent
Barz, Jr.

(10) Patent No.: US 9,069,815 B1
(45) Date of Patent: Jun. 30, 2015

(54) METHOD AND SYSTEM FOR RESPONDING TO QUERIES

(75) Inventor: George William Barz, Jr., Wilbraham, MA (US)

(73) Assignee: The Travelers Indemnity Company, Hartford, CT (US)

( * ) Notice: Subject to any disclaimer, the term of this patent is extended or adjusted under 35 U.S.C. 154(b) by 1914 days.

(21) Appl. No.: 10/700,576

(22) Filed: Nov. 5, 2003

Related U.S. Application Data

(60) Provisional application No. 60/424,013, filed on Nov. 6, 2002.

(51) Int. Cl.
*G06F 17/30* (2006.01)

(52) U.S. Cl.
CPC ................... *G06F 17/30424* (2013.01)

(58) Field of Classification Search
USPC .......................................................... 711/113
See application file for complete search history.

(56) References Cited

U.S. PATENT DOCUMENTS

| | | | | |
|---|---|---|---|---|
| 6,021,426 | A * | 2/2000 | Douglis et al. | 709/200 |
| 6,249,852 | B1 * | 6/2001 | Benayon et al. | 711/170 |
| 6,539,382 | B1 * | 3/2003 | Byrne et al. | 707/10 |
| 6,694,358 | B1 * | 2/2004 | Swildens et al. | 709/218 |
| 6,792,507 | B2 * | 9/2004 | Chiou et al. | 711/119 |
| 6,934,717 | B1 * | 8/2005 | James | 707/104.1 |
| 7,127,463 | B2 * | 10/2006 | Arnold et al. | 707/10 |
| 2002/0078300 | A1 * | 6/2002 | Dharap | 711/133 |
| 2002/0091712 | A1 * | 7/2002 | Martin et al. | 707/200 |
| 2003/0195884 | A1 * | 10/2003 | Boyd et al. | 707/7 |

FOREIGN PATENT DOCUMENTS

WO PCT/GB96/02977 * 6/1997 .............. G06F 17/30

* cited by examiner

*Primary Examiner* — Mahesh Dwivedi
(74) *Attorney, Agent, or Firm* — Stroock & Stroock & Lavan LLP

(57) ABSTRACT

Responding to queries directed to a database management system (DBMS) includes identifying data from a DBMS, where the identified data is at least partially responsive to a query, and where the identified data remains static over a period. Also including establishing a subset of the identified data in a computer memory, where the computer memory is characterized by an access latency less than the latency associated with retrieving the identified data using a query to the DBMS, and where the access latency is defined with respect to an application program operable to issue a query to which the identified data is responsive. Further includes trapping those queries intended for the DBMS where at least a portion of the response to the query corresponds to at least a portion of the established data; and resolving trapped queries at least in part using the corresponding established data.

10 Claims, 2 Drawing Sheets

Step 1 - Add MRESOBJ

Step 2 - Add a CICSLDO using the Memory Resident processor group for this element types

METHOD AND SYSTEM FOR RESPONDING TO QUERIES

CROSS REFERENCE TO RELATED APPLICATIONS

The present application claims priority to applicant's provisional patent Application No. 60/424,013, entitled Method and System for Responding to Queries, filed Nov. 6, 2002, which is incorporated herein in its entirety by reference.

BACKGROUND

The present invention relates to methods and computer program products for the retrieval of data stored in a database or as computer files. Specific embodiments relate to providing an alternate path for processing some data access requests from software applications.

Database management systems (DBMSs) are well known, e.g., IBM DB2. The more sophisticated systems provide a wide range of database management services, including traditional DBMS functions, application development environments, and business intelligence solutions.

SUMMARY OF THE INVENTION

In preferred embodiments, the present invention includes identifying data from a DBMS, where the data is responsive to a query and the data remains static over a period. Such data is then established in computer memory where the computer memory is characterized by an access latency less than the latency associated with retrieving the identified data using a query to the DBMS. Here, the access latency is defined with respect to an application program operable to issue a query to which the data is responsive. Those queries intended for the DBMS are trapped if the response to the query corresponds to the established data. The trapped queries are resolved using the corresponding established data.

In some embodiments, establishing data in a computer memory includes copying only one instance of each unique identified data element to memory and establishing pointers relating each instance of the data element from the DBMS to the copied data element. Additionally, in further embodiments, data elements are copied to separate storage pools based on the size or size range of the data element.

BRIEF DESCRIPTION OF THE DRAWINGS

Preferred embodiments of the present invention are shown by way of example and not limitation in the accompanying drawings.

DESCRIPTION OF THE INVENTION

Figure 1:
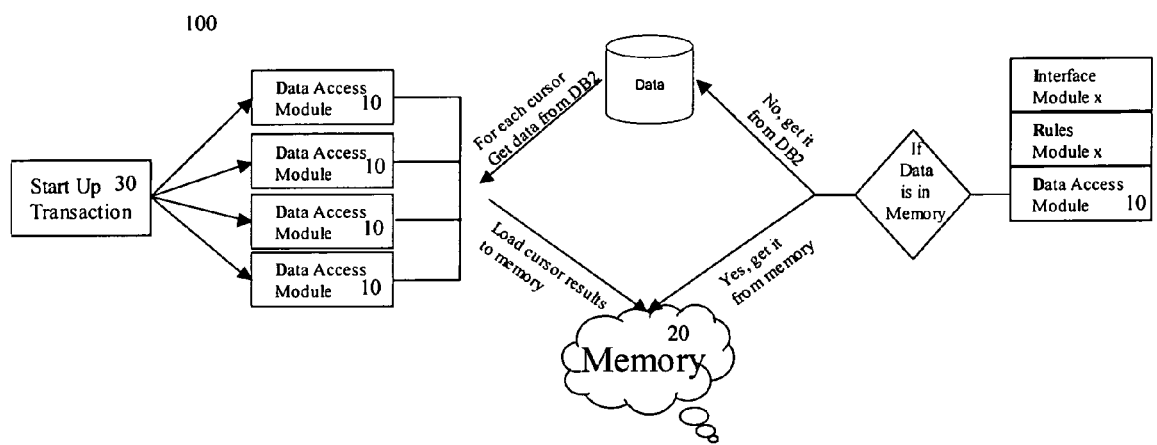
FIG. 1 is a block diagram illustrating aspects of preferred embodiments of the present invention.

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention.

While known DMBS programs offer a range of functionality, such programs are not typically tailored to handle a high volume of tasks or to respond to simple queries efficiently. Often the latency of a full-service DBMS (and data base management systems generally) with respect to high volumes of even the simplest tasks is undesirable. Further, typical databases contain data that is not written to frequently but that is frequently requested, e.g., static data. For example, insurance rate tables, jurisdictional requirements imposed on insurance products, and information relating to features of insurance products are relatively static over a typical business period and are frequently requested by customer service applications.

Preferred embodiments of the invention load static data from a DMBS into readily accessible memory, e.g., "main memory," where it can be accessed more expediently than if it were stored only in the DMBS. Some embodiments leave the static data in the DBMS storage location but establish its location via pointers. Preferred embodiments of the present invention trap data retrieval requests, e.g., Structured Query Language (SQL) statements, from software applications before the requests are acted upon by a DBMS. The trapped requests for data are resolved by directly accessing the data loaded into readily accessible memory, e.g., main memory.

To conserve main memory, data found in the DBMS more than once can be stored only once in main memory if it is associated with its multiple occurrences in the DMBS by use of pointers. For example, jurisdictional information applicable to several insurance products can be copied once to main memory, along with pointers that direct all those queries related to products using the jurisdictional information to the single instance of the information in main memory.

Before a query can be trapped and the corresponding data retrieved from main memory, a version of the query is processed to retrieve the data from the DBMS and store it in main memory. This can be referred to as the "initial load process," "startup transaction," or "establishing" the data in main memory. In some embodiments, the startup transaction is part of an application known as Customer Information Control System (CICS) software. The data stored in the CICS region's main memory by the initial load process remains in that memory until the CICS process for that region terminates. While the CICS process is executing in a region, the data stored by the initial load process, not the data in the DBMS storage, is the source of data returned to the requesting application programs running in the region when those programs query the database.

The initial load process can be resource-intensive with regard to the amount of central processing unit (CPU) resources it consumes. Single-column aggregation and aggregation-by-size are two methods for managing the amount of resources required for a startup transaction. In either case, the data can be stored in main memory in a way that does not resemble the rows-and-columns architecture of a relational DBMS.

In single-column aggregation, only the distinct values of a column are stored in memory. Pointers representing the rows of the column indicate the instances of the data that populate the rows of the column. The technique facilitates embodiments of the invention by making it possible to store large amounts of frequently accessed data in memory that has a shorter access latency than that experienced via the DMBS. In a preferred embodiment, every column returned from every query is sorted and compared.

In aggregation-by-size, separate storage pools are created in main memory to store items of a particular length. In some embodiments, items of a particular length range are stored in separate storage pools. For example, all data items ten bytes in length, from any column of any query result, can be stored in a single storage pool; another pool can hold all data items twelve bytes in length and so on. As with the single-column aggregation, only distinct values of the data are placed in the storage pool. Pointers representing the rows of the columns can point to the content for any particular row.

Aggregation-by-size reduces the CPU time used for initial loading under that required by single-column aggregation and by other methods. In addition, aggregation-by-size allows more data to be stored in main memory than allowed by single-column aggregation. This in turn further reduces the CPU resources used by applications by allowing more data retrieval operations to bypass the DBMS.

Referring to FIG. 1, a block diagram illustrating aspects of preferred embodiments of the present invention is shown 100. In these embodiments, e.g., in the CICS application, portions of the code that are used to interface with the DBMS are called data access modules, or D modules 10. In preferred embodiments of the invention, performance analysis is used to identify static data, e.g., product rules that remain the same over a business period. Those D modules 10 found to access static data are modified to operate in three modes, e.g., start-up, SQL, and memory-resident modes. In start-up mode, a D module 10 loads static data into local memory 20 from the database. In SQL mode, the D module 10 identifies SQL statements that request data not found in local memory 20 and uses the DBMS to access that data. In memory-resident mode, the D module 10 identifies SQL statements that request data found in local memory 20 and accesses that data in local memory 20. In these embodiments, each modified D module 10 is registered to a start-up transaction 30. The start-up transaction 30 executes when a CICS region is started and executes each D module 10 in start-up mode. In this mode, CICS retrieves static data from the DBMS and places it in to local memory 20. This data remains in local memory 20 until the region is shut down.

In preferred embodiments, modification of D modules proceeds as follows. COBOL source code for D modules is modified by a code generator that inserts traps around SQL statements with logic to access local memory instead of the DBMS in real time, e.g., "memory resident." The code generator also inserts start-up logic that is executed when called by a start up transaction 30. Existing logic for issuing SQL statements is preserved for execution in real-time when running in an environment where memory resident is not active. The modified D modules are registered with the start up transaction.

Figure 2:
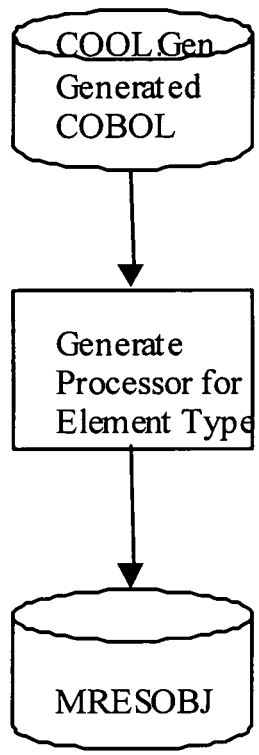
FIG. 2 illustrates a development methodology of preferred embodiments of the present invention.
Figure 2:
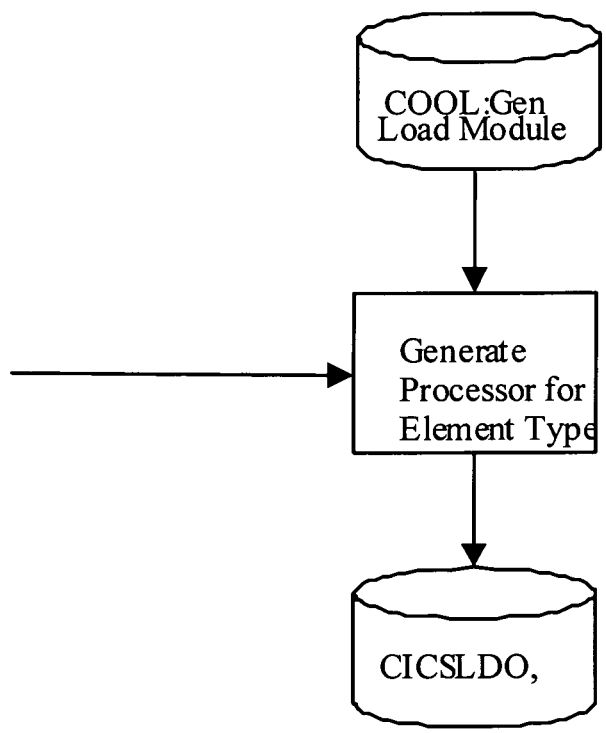

Referring to FIG. 2, in a preferred development environment, e.g., COBOL Object-Oriented Language: Generator (COOL:Gen), memory resident functionality is implemented by taking COOL:Gen code as input and writing modified COBOL code as output. The approach introduces an element type MRESOBJ and a processor group for a CICS load (CICSLDO) element type. Memory resident code is generated to run on platforms other than CICS platforms, e.g., batch processing platforms. However, the COOL:Gen code it wraps calls runtime modules that do vary based on platform. The MRESOBJ object type enables a process that allows the code to be compiled once (Step 1) and then link edited (Step 2) as needed to create load modules for each target environment in which the code must run.

Step 1 starts with COBOL code generated by COOL:Gen and results in an object module that contains the memory resident logic. Step 2 starts with the load module that COOL:Gen created. That load module does not contain memory resident code, but it does contain the runtime modules necessary to create an executable load module for a specific target environment e.g., CICS. The result from Step 2 is a load module that combines those runtime modules with the memory resident object module that was added in Step 1.

I claim:

1. A computer program product for avoiding structured database queries directed to a database management system (DBMS) by an application program, the computer program product comprising:
    a non-transitory tangible computer-readable medium;
        a code generator module, wherein the code generator module:
        is stored on the medium, and
        is operative to automatically modify a source code of the application program before application program run time, wherein said modifying comprises:
            inserting start-up code in the source code; and
            inserting trap code in the source code to avoid at least one structured database query; and
    an establishment module, wherein the establishment module:
        is stored on the medium,
        is executed after the code generator module and before the application program run time,
        is in communication with the DBMS containing identified data that is at least partially responsive to the at least one structured database query, and that is static over a period, and
        is operative to execute the start-up code to establish at least a subset of the identified data in a local main memory before the application program run time, by retrieving the identified data from the DBMS and storing the identified data in the local main memory, and
        where the local main memory is characterized by an access latency less than the latency associated with retrieving the identified data using the structured database query, and where the access latency is defined with respect to the application program; and
    wherein the trap code:
        is stored on the medium;
        is executed at the application program run time; and
        is operative to avoid executing the at least one structured database query when at least a portion of the response to the structured database query corresponds to at least a portion of the identified data stored in the local main memory; and
        is operative to provide the response to the avoided structured database query at least in part using the identified data stored in the local main memory without executing the structured database query.

2. The computer program product of claim 1, wherein the establishing the at least a subset of the identified data in the main memory further comprises:
    establishing only one instance of each identified data element from the DBMS in the main memory; and
    establishing pointers directing all queries related to the data element from the DBMS to the one instance of the data element in the main memory.

3. The computer program product of claim 2, wherein the establishing only one instance of each identified data element from the DBMS in the main memory further comprises:
    storing data elements in separate storage pools based on the size of the data element.

4. The computer program product of claim 3, wherein the storing the data elements in separate storage pools based on the size of the data element further comprises:
   storing data elements of a range of sizes in the same storage pool.

5. A method performed by a computer system of providing data to an application program, wherein the application program includes a structured database query to a database management system (DBMS) to request data stored in a database, comprising:
   identifying data that is at least partially responsive to at least one structured database query to be executed by the application program, and that is static over a period;
   automatically modifying a source code of the application program before the application program run time, wherein said modifying comprises:
      inserting start-up code in the source code; and
      inserting trap code in the source code to avoid the at least one structured database query; and
   executing the modified application program, wherein said executing comprises:
      at start-up, retrieving the identified data responsive to the at least one structured database query and storing the identified data in a local main memory; and
      at run time, avoiding executing the at least one structured database query when the at least one structured database query has a request for data that is stored in the local main memory, and directly accessing the requested data from the identified data stored in the local main memory instead of the data stored in the DBMS without executing the structured database query, and
   where the local main memory is characterized by an access latency less than the latency associated with retrieving the identified data from the DBMS using the at least one structured database query, and where the access latency is defined with respect to the application program.

6. A method performed by a computer system of avoiding structured database queries for requesting data from a database management system (DBMS) by an application program, the method comprising:
   prior to application program run time:
      identifying the data in the DBMS responsive to at least one structured database query to be executed by the application program,
      retrieving the identified data from the DBMS, and
      storing the identified data in a local main memory;
   automatically modifying a source code of the application program to directly access at run time the identified data stored in the local main memory, creating a modified application program;
   executing the modified application program; and
   while executing the modified application program, avoiding executing the at least one structured database query and directly accessing the identified data stored in the local main memory without executing the structured database query.

7. A method performed by a computer system of automatically modifying an application program having structured data queries that request data from a database management system (DBMS), comprising:
   identifying a subset of data in the DBMS responsive to at least one of the structured data queries, retrieving the identified subset of data from the DBMS, and storing the identified data in a local main memory prior to application program run time; and
   automatically modifying the application program to insert trap code to perform trapping of at least one of the structured data queries, said trapping comprising, during execution of the modified application program:
      determining whether the structured query has a request for data that is in the identified data stored in the local main memory; and
      when the structured query has a request for data that is in the identified data stored in the local main memory, avoiding executing the structured query by directly accessing the identified data stored in the local main memory without executing the structured query.

8. The method of claim 6, wherein the storing the identified data in the main memory further comprises:
   establishing only one instance of each identified data element from the DBMS in the main memory; and
   establishing pointers directing all queries related to the identified data element from the DBMS to the one instance of the data element in the main memory.

9. The method of claim 8, wherein the establishing only one instance of each identified data element from the DBMS in the main memory further comprises:
   storing data elements in separate storage pools based on the size of the data element.

10. The method of claim 9, wherein the storing the data elements in separate storage pools based on the size of the data element further comprises:
   storing data elements of a range of sizes in the same storage pool.

* * * * *